United States Patent [19]

Lillyman et al.

[11] 3,928,538
[45] Dec. 23, 1975

[54] PROCESSING OF URANIUM HEXAFLUORIDE INCLUDING ABSORPTION OF URANIUM HEXAFLUORIDE IN AQUEOUS ALUMINUM NITRATE

[75] Inventors: Ernest Lillyman; Frank Charles Mascall, both of Thurso; Cecil George Mathers, Halkirk, all of Scotland

[73] Assignee: United Kingdom Atomic Energy Authority, London, England

[22] Filed: Oct. 29, 1973

[21] Appl. No.: 410,354

[30] Foreign Application Priority Data
Nov. 8, 1972    United Kingdom............... 51500/72

[52] U.S. Cl. .................... 423/260; 423/8; 423/253
[51] Int. Cl.² ....................................... C01G 43/02
[58] Field of Search ............ 423/253, 258, 260, 10, 423/8

[56] References Cited
UNITED STATES PATENTS

| | | |
|---|---|---|
| 3,395,992 | 8/1968 | Wolfsberg et al....................... 423/7 |
| 3,511,621 | 5/1970 | Ishimori et al......................... 423/10 |
| 3,745,205 | 7/1973 | Peppard et al......................... 423/10 |
| 3,758,664 | 9/1973 | Gerrald............................ 423/253 X |

OTHER PUBLICATIONS

*Nuclear Science Abstracts,* 21, No. 8, Abs. No. 12380, (1967).

ibid, p. 67 of subject index, "Aluminum Nitrates" (1967).

*Primary Examiner*—Benjamin R. Padgett
*Assistant Examiner*—E. A. Miller
*Attorney, Agent, or Firm*—Larson, Taylor and Hinds

[57] ABSTRACT

A process in which uranium hexafluoride enriched in $U235$ is converted to an aqueous uranyl nitrate solution (for subsequent production of oxide). Uranium hexafluoride vapour is absorbed in aqueous aluminium nitrate solution which is then contacted with an organic solvent for extracting uranium and the solvent is washed with dilute nitric acid.

2 Claims, 1 Drawing Figure

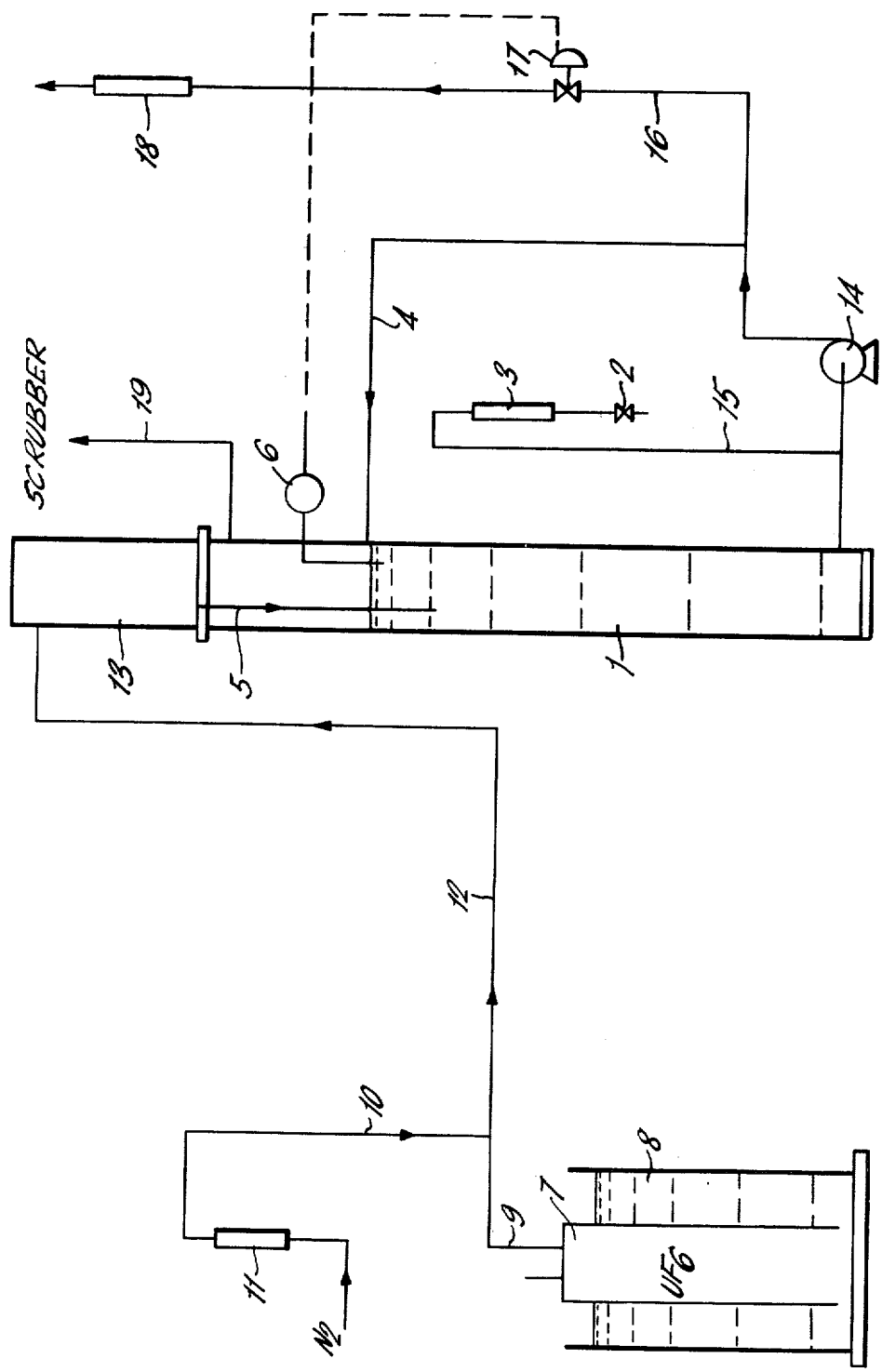

PROCESSING OF URANIUM HEXAFLUORIDE INCLUDING ABSORPTION OF URANIUM HEXAFLUORIDE IN AQUEOUS ALUMINUM NITRATE

BACKGROUND OF THE INVENTION

This invention relates to the processing of uranium hexafluoride particularly for its conversion to oxide.

The enrichment of uranium compounds in the fissile isotope U235 is generally effected by treatment of uranium hexafluoride which is subsequently converted to the compound required. A common requirement is for uranium dioxide for use as a nuclear fuel and hitherto it has been obtained by pyro-hydrolysis of the hexafluoride but this is not entirely satisfactory as problems arise with the formation of hydrogen fluoride during the process and with the form of the solid product which, because of its enrichment, gives rise to handling and containment problems. Alternatively the absorption of uranium hexafluoride in water has been practised. This practice results in a corrosive solution of hydrofluoric acid. It thus requires special materials of construction and neutralisation before subsequent stages of the process are carried out.

SUMMARY OF THE INVENTION

According to the present invention uranium hexafluoride vapour enriched in U235 is absorbed in aqueous aluminium nitrate solution to complex the fluoride, the aqueous solution is brought into contact with an organic solvent for preferentially extracting uranium from the aqueous solution and the organic solvent is washed with dilute nitric acid to produce an aqueous uranyl nitrate solution.

The production of uranium oxides from the uranyl nitrate solution may follow known routes, for example, the precipitation of ammonium diuranate by the addition of ammonia followed by thermal decomposition to higher uranium oxides and reduction with hydrogen to uranium dioxide.

DESCRIPTION OF THE DRAWING

The invention will now be described with reference to the accompanying drawing which is a line diagram.

DESCRIPTION OF THE PREFERRED EMBODIMENT

In the diagram is shown a column 1 to which is fed 0.8M aluminium nitrate via a line 4, the flow rate being 40 l/hour. Uranium hexafluoride vapour dispersed in nitrogen gas is also fed to the column 1-(at a flow rate of 2KgU/hour) via a line 5 which extends below the liquid level in the column 1, the level being controlled by a level controller 6. The uranium hexafluoride vapour is supplied from a cylinder 7 immersed in a water bath 8 maintained at 88°C to ensure vaporisation of the hexafluoride. The outlet 9 from the cylinder 7 connects with a nitrogen feed line 10 including a flowmeter 11. The mixture of nitrogen and hexafluoride vapour proceeds via a line 12 to a suck back pot 13 before entering the line 5.

In the column 1 the uranium hexafluoride is absorbed in the aluminium nitrate solution which is circulated and discharged by means of a pump 14. Make up of aluminium nitrate is effected from a stock tank (not shown) via a control valve 2, flowmeter 3 and line 15. Discharge is effected via a line 16 including an automatic discharge valve 17 (linked electrically to the level controller 6) and a flowmeter 18, to a feed tank for a solvent extraction plant in which the aluminium nitrate solution containing uranium forms the aqueous phase in the first stage. A portion of the uranium containing aluminium nitrate solution is recycled to the top of the column 1. Off gases (mainly nitrogen) leave the column 1 via a line 19 for a scrubber (not shown).

Control is required of the aluminium and nitrate ion concentration and of the uranium hexafluoride concentration to avoid precipitation of aluminium fluoride. The complexing of the fluorine avoids evolution of hydrogen fluoride and stainless steel vessels may therefore conveniently be used in the process.

After initial absorption of the uranium hexafluoride vapour in liquid the processing is carried out in the liquid phase throughout and this eases problems of criticality when highly enriched uranium is being processed. The solvent extraction process in which the aqueous uranium/aluminium solvent is contacted with an organic solvent such as tributyl phosphate and the resultant organic phase backwashed with 0.05N nitric acid is well understood and readily controlled. See, for example Progress in Nuclear Energy Series III Process Chemistry Vol. 1 published by Pergamon Press Ltd, London 1956, particularly Chapter 5.4, Section 7.

We claim:

1. A process in which uranium hexafluoride vapour enriched in U235 is absorbed in aqueous aluminium nitrate solution to complex the fluoride, the aqueous solution is brought into contact with an organic solvent for preferentially extracting uranium from the aqueous solution and the organic solvent is washed with dilute nitric acid to produce an aqueous uranyl nitrate solution.

2. A process as claimed in claim 1 including the subsequent step of converting the aqueous uranyl nitrate solution to an oxide of uranium.

* * * * *